United States Patent
Zoldi et al.

(10) Patent No.: US 11,709,918 B2
(45) Date of Patent: *Jul. 25, 2023

(54) BUILDING RESILIENT MODELS TO ADDRESS DYNAMIC CUSTOMER DATA USE RIGHTS

(71) Applicant: FAIR ISAAC CORPORATION, Roseville, MN (US)

(72) Inventors: Scott Michael Zoldi, San Diego, CA (US); Shafi Ur Rahman, San Diego, CA (US)

(73) Assignee: FAIR ISAAC CORPORATION, Roseville, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/852,280

(22) Filed: Apr. 17, 2020

(65) Prior Publication Data

US 2020/0242216 A1 Jul. 30, 2020

Related U.S. Application Data

(63) Continuation of application No. 15/819,338, filed on Nov. 21, 2017, now Pat. No. 10,657,229.

(51) Int. Cl.
*G06F 21/10* (2013.01)
*G06F 21/62* (2013.01)
*G06Q 10/04* (2023.01)
*G06Q 30/0201* (2023.01)

(52) U.S. Cl.
CPC ........ *G06F 21/105* (2013.01); *G06F 21/6218* (2013.01); *G06Q 10/04* (2013.01); *G06Q 30/0201* (2013.01); *G06F 2221/0755* (2013.01); *G06F 2221/0771* (2013.01)

(58) Field of Classification Search
CPC ............... G06F 21/105; G06F 21/6218; G06F 2221/0755; G06F 2221/0771; G06Q 10/04; G06Q 30/0201
See application file for complete search history.

(56) References Cited

U.S. PATENT DOCUMENTS

| 8,417,715 | B1 | 4/2013 | Bruckhaus et al. |
| 9,373,080 | B1 * | 6/2016 | Satish ................... G06Q 10/04 |
| 2003/0061482 | A1 * | 3/2003 | Emmerichs ......... G06F 21/6218 713/165 |

(Continued)

*Primary Examiner* — Noura Zoubair
*Assistant Examiner* — Zoha Piyadehghibi Tafaghodi
(74) *Attorney, Agent, or Firm* — Mintz Levin Cohn Ferris Glovsky and Popeo, P.C.

(57) ABSTRACT

A system and method for constructing an improved computing model that preserves use rights for data utilized by the model. A first dataset is accessed to build a computing model. The first data set is subject to terminable usage rights provisions. A portion of the first dataset is sampled to generate a second dataset. Vectors present in the first dataset and the second dataset are discretized. In response to determine that the usage rights associated with the primary dataset have been terminated, a coverage depletion for the second dataset is computed based on the usage rights termination associated with the first dataset. An estimated mean time to coverage failure for the first model based on the depletion coverage is determined for the second dataset. One or more data points are removed from the first dataset due to the termination of usage rights.

20 Claims, 20 Drawing Sheets

(56) References Cited

U.S. PATENT DOCUMENTS

| | | |
|---|---|---|
| 2004/0215501 A1 | 10/2004 | d'Ornano |
| 2008/0148067 A1* | 6/2008 | Sitrick .................... G06F 21/10 |
| | | 705/52 |
| 2014/0006347 A1* | 1/2014 | Qureshi ............. G06F 21/6209 |
| | | 707/783 |
| 2014/0200953 A1* | 7/2014 | Mun ...................... G06Q 40/08 |
| | | 705/7.28 |
| 2014/0283031 A1* | 9/2014 | Eksten .................. G06F 21/105 |
| | | 726/22 |
| 2016/0048766 A1 | 2/2016 | McMahon et al. |
| 2017/0083937 A1 | 3/2017 | Fadil |
| 2017/0243028 A1 | 8/2017 | LaFever et al. |
| 2018/0049043 A1 | 2/2018 | Hoffberg |
| 2019/0163802 A1* | 5/2019 | MacLean ................ G06F 16/21 |

\* cited by examiner

FIG. 1.

| | | | | |
|---|---|---|---|---|
| F01A | 5/3/2015 | N/A | | |
| EC18 | 5/3/2015 | 5/2/2017 | | |
| | | | | |

FIG. 12

| 1 | | # Late Payments last 9 months | |
|---|---|---|---|
| | 1 | 0 | 20 |
| | 2 | 1 | 10 |
| | 3 | 2 or more | 5 |
| 2 | | Age of account | |
| | 1 | below 1 year | 5 |
| | 2 | 1-2 years | 10 |
| | | etc. | |
| 3 | | Debt Ratio | |
| | 1 | 0-30 | 15 |
| | 2 | 30-50 | 10 |
| | 3 | 50-70 | 5 |
| | | etc. | |

FIG. 19

BUILDING RESILIENT MODELS TO ADDRESS DYNAMIC CUSTOMER DATA USE RIGHTS

CROSS-REFERENCE TO RELATED APPLICATIONS

The present application is a continuation of and claims priority to the earlier filing date of U.S. patent application Ser. No. 15/819,338 filed on Nov. 21, 2017, the content of which is hereby incorporated by reference herein in entirety.

TECHNICAL FIELD

The subject matter described herein relates to electronic data use rights, and more particularly to a computer-implemented system and method for building resilient models to address dynamic customer data use rights or any scenario that necessitates withdrawal of data points that were used to build an existing model.

BACKGROUND

Increasingly, businesses are put in the unique position of having to effectively deal with dynamic customer data use rights in the development and maintenance of predictive or decision models. Whether as a result of the loss of data license rights, withdrawal of customer consent, or other events that affect the composition or availability of customer data used in the development of these models, there is a need to account for such events in a way that is efficient and statistically valid, without resorting to automatic model retraining software. A rush to automatic model retraining software in such situations would only erode an ability to build good models and would have a direct economic impact on companies that depend on models derived on customer data to provide these services.

Two models can be defined as equivalent if they are trained on the same developmental data and their model architecture and model parameters are identical. A model is said to be resilient if minor changes in the modeling data membership does not lead to changes in the model architecture and parameters. If a model remains resilient after prescribed changes in the developmental sample, the original model is said to remain valid. If a data point is removed from the developmental sample data of the model, the resultant model would almost always have changes in the model parameters, however small. In such cases, the original model may cease to be valid. When a customer's data is used to build a model, and the customer's data is subsequently removed from the developmental sample, the only way to ensure the validity of the model after removing a data point is by ensuring that the developmental data remains unchanged.

While building models, usually a subset of available data is used for modeling through a sampling process. This presents an opportunity to remove the data-point of a withdrawn customer data record from the developmental dataset, and replace it with the data point of another customer's data record which has identical distribution of values but was not sampled earlier for the developmental dataset. We call such customers "surrogates" of the original customer. This approach allows the developmental data to remain unchanged, thus ensuring the model remains valid. All that changes is the membership for the coverage of the data records in the modeling data set. Coverage of a data record is the number of surrogates it has. It should be noted that a given customer might have more than one data records.

The challenge faced often in identifying a surrogate arises from the fact that the data has many real valued features. Due to the real valued nature, such features together have an infinite number of unique combinations. This implies that for a given customer, it would be impossible to find an identical customer who has the exact same values for each of the features. This necessitates developing a discretization of the feature space to ensure proper coverage.

SUMMARY

A system and method for extending the validity of predictive and decision models for significant duration, and minimizing the need for frequent model rebuilds are provided, especially in a modeling environment of data right usage withdrawal. More specifically, each instance of data right usage withdrawal is ensured to not trigger a model rebuild. Furthermore, the systems and methods described herein provide a process for complying with data right usage withdrawal, either full or partial withdrawal, in an automated manner, alleviating the need for the model owner to do this manually. A data governance capability is provided that keeps track of the usage rights of each available data point.

A model governance capability is also provided that keeps track of the current state of the model, by periodically computing and reporting the coverage statistics and rate of coverage depletion. To allow for proactively determining when to rebuild the model, the estimated mean time to coverage failure is computed, and reported along with the other model governance statistics. This provides the model owner with an estimate of when the model must be rebuilt based on coverage issues by measuring mean and expected model validity failure times based on the depletion of surrogate data. Thus, it is possible to deal with data right usage withdrawal while keeping the underlying predictive and decision models valid.

A system and method for constructing an improved computing model that preserves use rights for data utilized by the model is also provided. A first dataset is accessed to build a computing model. The first data set is subject to terminable usage rights provisions. A portion of the first dataset is sampled to generate a second dataset. Vectors present in the first dataset and the second dataset are discretized. In response to determine that the usage rights associated with the primary dataset have been terminated, a coverage depletion for the second dataset is computed based on the usage rights termination associated with the first dataset. An estimated mean time to coverage failure for the first model based on the depletion coverage is determined for the second dataset. One or more data points are removed from the first dataset due to the termination of usage rights.

In certain embodiments, the determining the estimated mean time to coverage failure comprises measuring a mean and an expected model validity failure time based on the depletion of the second dataset. The first dataset is stored as a set of key values in a database, at least a first key value having a primary key to uniquely identify a first entity associated with first data included in the first dataset. The first entity has the right to terminate usage rights associated with the first data included in the first dataset, and a secondary key is associated with the primary key, the secondary key corresponding to a transaction data point for the first entity. A one-way hash function is applied on the primary key to generate a hashed value to identify the first entity. A consent validity of the first entity is tracked to determine the first entity's continued consent for use of data associated with the first entity in the first model. Data points removed from the first model are replaced with surrogate data points from the second dataset, when such surrogate data points are deemed to be similar to the data points removed.

In one aspect, a system, method and computer program product is presented, for building a decision or prediction model used for analyzing and scoring behavioral transactions. A customer dataset in a model development store is used to build an original model is subject to a data right usage withdrawal, the original model having coverage over the customer dataset extract, using data sampling, a portion of the customer dataset to generate a model surrogate dataset. The system and method discretize vectors present in both the model surrogate dataset and the customer dataset, and receive data representing the data right usage withdrawal from the customer dataset. The system and method determine a depletion of the model surrogate dataset according to the data right usage withdrawal, and compute an estimated mean time to coverage failure of the original model based on the depletion of the model surrogate dataset according to the data right usage withdrawal Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein.

Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 illustrates a grid of cells formed by discretized bins of two features;

FIG. 12 shows a schematic example of a data usage meta-store;

FIG. 19 is a schematic of a sample scorecard model, with feature bins assigned score weights.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide systems, methods and computer program products for building resilient models to address dynamic customer data use rights and other scenarios that render a previously used data example that is unusable in the model. To overcome the challenge of identifying surrogates, implementations of the subject matter described herein discretize each feature that is a predictor in the model. Each feature is split into value ranges, called "bins," and a customer is assigned to one of these bins for each feature. Real world problems require multiple features, thus combination of discretized features leads to an explosion of unique combinations of cells from the intersection of these bins.

Figure 1:
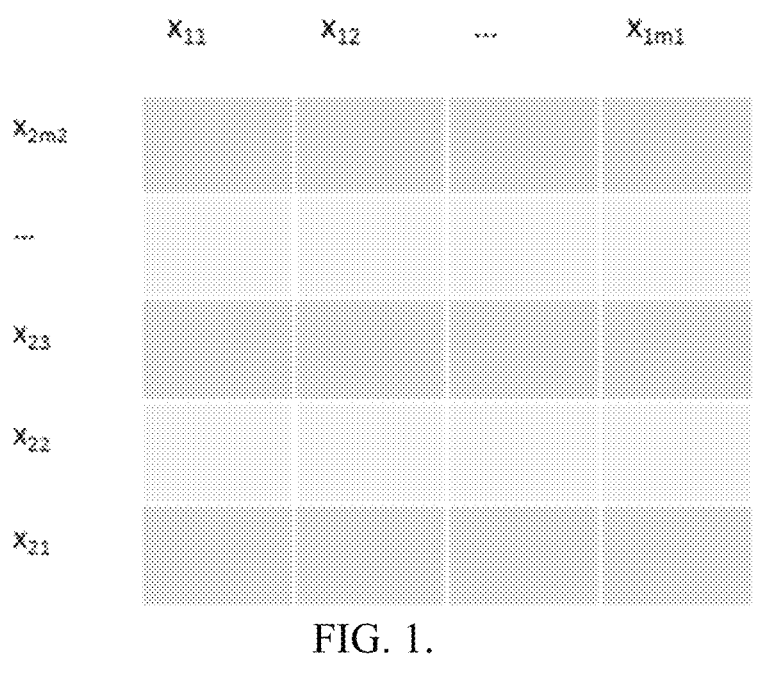

As an example, consider data points which have only 2 features, $x_1$ and $x_2$, and further assume $m_1$ and $m_2$ number of discretized bins respectively. Thus, feature $x_1$ has bins $x_{11}$, $x_{12}, \ldots x_{1m1}$ with adjacent bins sharing adjacent real values at their respective boundaries. Feature $x_2$ has bins $x_{21}$, $x_{22}, \ldots x_{2m2}$ with adjacent bins sharing adjacent real values at their respective boundaries. In this case, there are $m_1 * m_2$ unique number of cells representing number of combinations of discretized bins, as shown in FIG. 1.

Figure 2:
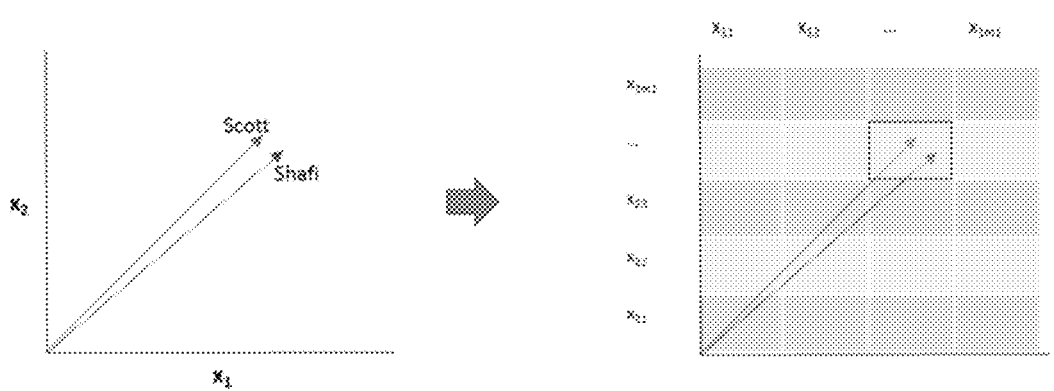
FIG. 2 illustrates two customers with different feature vectors in a two-dimensional feature space get assigned to the same cell.

In accordance with the example, two customers can have the same value of a feature vector when both their values lie within the same discretized bin. Thus, two customers are the same if their values lie within the same discretized bins for each of the features. Such same customers lie in the same cell as formed by the discretized bins of all features are surrogates of each other. FIG. 2, for instance, shows two customers, Scott and Shafi, who have slightly different feature vectors, but due to the process of feature discretization, end up in the same cell. The process of feature discretization thus translates the infinite number of unique combinations of the 2 features, $x_1$ and $x_2$ into a manageable number of finite combinations, making it viable to identify surrogates.

To operationalize on a large scale, each variable is discretized into value range bins. Discretization can be done in one of several ways. In some implementations using equi-sized bins, each variable is divided into decile bins with equal population. In other implementations using entropy bins, each variable is divided into the bins such that the overall entropy is maximized. In all approaches, each bin should have a minimum number of data-points, $\eta$, for stable statistics. Bin creation can be part of the model design, and can vary based on application.

In the entropy approach, to control the number of discretized bins of each feature, the bins are first discretized to maximize the entropy. Then, two adjacent bins are grouped together such that it leads to the least reduction in entropy. Adjacent bins are continued to be grouped together until the number of data points in each bin is greater than 11 or the loss in entropy is less than an acceptable loss threshold, $\zeta$. This ensures the most optimal number and size of bins for each feature. This has an impact on minimum coverage as described below.

In general, datasets are multi-variate. Thus, the number of cells is the total number of unique combinations that can be formed by choosing one of the discretized bins for each of the features. For example, if there are n features in the dataset, each with $m_1, m_2, \ldots m_n$ number of discretized bins, then the total unique combinations or number of cells are $m_1 * m_2 * \ldots * m_n$. As a further example, for 8 feature variables, with 10 bins each, there are $10^8$ unique number of cells, or 100 Million cells. All data points must reside in one of these cells. Coverage of a cell is defined as the number of customer data points that reside in the cell. Similarly, coverage of a customer vector is the number of other customer vectors that share the same cell in such a grid.

Let, i be the index for a cell, where i is indexed in the discretized feature space
Let, ij be the index for a data point in cell i.
Let, C denote coverage.

Then, the following relationship can be provided as:

$$C(ij)=C(i)-1 \ \forall i,j$$

Coverage of the cell is the number of data points in a cell. Coverage of a data point in that cell is all the other data points in that cell. Also, data points in the same cell have substantially the same coverage, as shown below:

$$C(ik)=C(il) \ \forall k,l \in j$$

Accordingly, all the data points in a single cell have the same coverage.

When a decision or prediction model is built, the entire original customer dataset is used for model development. But through a process of data sampling, a subset of this data set is extracted, and this dataset is called the model development dataset. The remainder of the original dataset is not used to build the model, but is called the model surrogate dataset, for reasons explained further herein. Vectors present in both the datasets are designated to separate grids of the type shown in FIGS. 1 and 2, through the process of discretization. This is done to keep the implementation clean and efficient. Accordingly, additional coverage definitions can be defined as follows:

C(model development, i)=# of customers in the i cell for the data points in the model development dataset.

C(model surrogate, i)=# of customers in the i cell for the data points in the model surrogate dataset.

Figure 3:
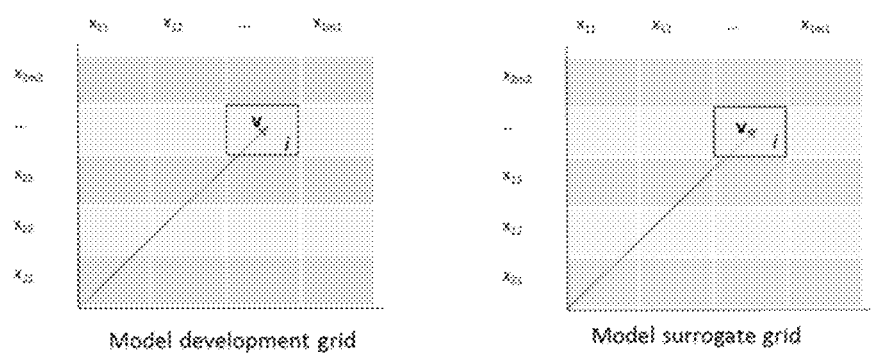
FIG. 3 shows two data grids, one for model development and another for model surrogate. In both the grids, a vector, v, falls in the same cell, indexed by the same i.

Note that in both grids, the model development and the model surrogate grids, as shown in FIG. 3, the indexation of the cells in the discretized feature space is kept consistent, such that an arbitrary vector is assigned to the same index in both grids. Sufficient counts in a cell i, in the model surrogate grid implies that a vector not yet used in the model development can be utilized as a vector in the cell i in the model development dataset. Whether sufficient coverage for all data points is achieved depends on the number of cells and a total number of data points available before down sampling. Due to the large number of features, there are a large number of cells in the grid. For instance, if there are n features in the dataset, each with m number of discretized bins, there will be a total of $m_n$ number of cells. This implies that the number of cells increase exponentially with the number of features, which characteristic is described in further detail below.

Figure 4:
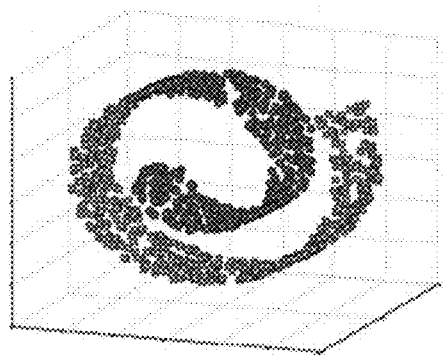
FIG. 4 shows that, due to large number of features and bins, there is sparse coverage, but due to manifold nature of most datasets, some cells have sufficient coverage.

As shown in FIG. 4, the distribution of data-points in such a discretized grid is sparse due to the large number of cells. Most cells do not have any data points, or have very few data points. In other words, they have zero or very low coverage, suggesting though that most data points in a data set reside on manifolds of significantly lower dimensionality. This implies that some of the cells have very high counts even though overall distribution is very sparse. Because of this nature of distribution, for most of the data-points, a surrogate can be found, i.e., another data-point in the surrogate dataset that has the same coverage, as long as both coverage in the model development and model surrogate data sets is ensured.

While sampling data for the developmental dataset, an unbiased sampling scheme can be used. If there are different population sub-segments of interest, the sampling scheme is biased to sample some sub-segments more than the others. This is called stratified sampling. In some implementations of the present disclosure, a unique sampling scheme is used that is biased to ignore sparse cells, i.e., the cells which have very low coverage. Ignoring such cells in sampling the developmental dataset would ensure that data points used in model development have a sufficient number of surrogates in the surrogate data set that could be used to replace a data point from the modeling data set if it is withdrawn.

To enable this, a minimum coverage β is defined, which represents the minimum number of data points in a cell in the model development dataset. If coverage is below β, the cell is treated as sparse. If a cell is sparse then during sampling, the data points in that cell are ignored, to draw into the model development dataset. The rest of the cells have sufficient coverage and are sampled. Thus a cell, i, is sampled if:

C(model development, i)=$n_i$ for cell i, such that $n_i$>β.

In the model surrogate dataset, the minimum coverage is required to be N times larger than that in the model development dataset, where N is called the coverage ratio. This ratio provides the minimum number of surrogates available per data point in the model developmental dataset.

Thus the following constraint for sampling a cell i is imposed:

C(model surrogate, i)=$n'_i$ for cell i, such that $n'_i$>βN.

Let ρ be the sampling ratio. Then the following equation describes relationship between sampling ratio, ρ, and coverage ratio, N:

$$\rho = \frac{1}{(1+N)}$$

Thus, while sampling, we need to meet the following two criteria:
- Minimum coverage, β, such that for each cell i in the model development dataset, we sample that cell if $n_i$>13,
- We sample each data point in the $i^{th}$ cell maintaining a sampling ratio, ρ, which yields minimum coverage of N.

For a cell, i, that meets the minimum coverage criterion, some points, $n_i$, are sampled to be in the model developmental dataset and hence are in the model. The rest, $n_i'$ are not in the model and are part of the model surrogate dataset. In such a case, $n_i'$ is the coverage buffer. Due to withdrawal of the data point, and according to a process described below, the coverage of the cell i in the model surrogate dataset can reduce. Once the coverage buffer becomes 0, there are no further surrogates available to replace a data point in cell i in the model. Any further withdrawal of data points from that cell i, would make the model invalid in that it would be based on customers that it didn't have consent to include in model development and subsequent deployment/use.

Refer to the set of features present in the model as the predictor set, and the curse of dimensionality and its impact on the coverage as discussed above. As described with reference to FIGS. 1-4, as the number of features and number of bins for each feature increase, most of the cells end up with zero or near zero coverage. These cells do not have minimum coverage, and the sampling scheme ignores the data points in such cells. Further, due to the manifold nature of the data distribution, a substantial number of data points reside in a smaller number of cells. In general, the larger the number of cells, the more data gets discarded due to minimum coverage criterion.

To manage the number of cells from increasing exponentially, both the cardinality of the predictor set, i.e., the number of features in the model are controlled, as well as the number of discretized bins of each feature in the predictor set. To manage the number of features in the predictor set, rigorous variable selection is conducted. The number of bins into which each feature is discretized is also limited to a predetermined number, such that a sufficient number of cells can be sampled, with each cell having minimum coverage as described in the previous section.

It is worth noting that rigorous variable selection is a standard practice in building machine learning, neural network and scorecard models. In one implementation of variable selection, where interpretability of the features is of prime concern, a variable clustering technique is used to group together features into various groups. Each group represents the features that are highly correlated with each other but weakly correlated with the features in other groups. Then, one of the two techniques is used for selecting the features for the predictors in the model. When an automated way of selecting the features is needed, a randomized technique for picking one feature from each group can be used. When domain expertise needs to be instituted, a human expert can pick one feature from each group. In either approach, substantial dimensionality reduction is achieved.

In another implementation, where black-box models are used and interpretability of the features is not important, Principal Component Analysis is used for reducing the number of features. In this approach, the original features are projected onto their eigenvectors, which are orthogonal to each other. Often only a subset of eigenvectors is sufficient to represent the variation in the data, and the rest of the eigenvectors can be discarded. This leads to a substantial reduction in the number of features required in the model.

To fit the model, first determine a sampling ratio, ρ. This is determined based on the coverage ratio we want to maintain, as described above. Next, apply binarization to convert each bin into binary indicator variable. This process is more fully described below. Using these binary features of the predictor set, a model is fitted. No restriction is imposed on the type of model that can be fit as long as it can use binary features or which could give real-valued approximations to continuous variables through a string of bins associated with one of the inputs. The model could be an NNET model or a Random Forest model or a Scorecard model, for example.

Several approaches for representing data points can be used. One approach is used for indexing the data points and their corresponding cells, called grid indexing. Another approach is used to represent them for use in the models. This approach is called binarization. These are described in further detail below.

Figure 5:
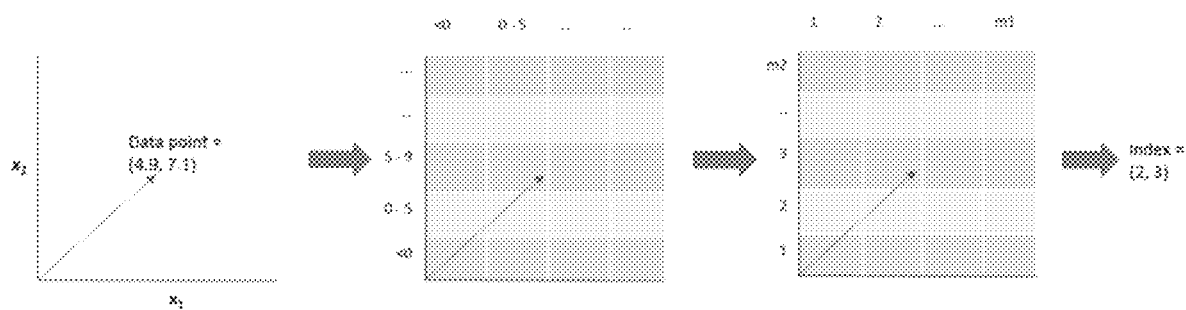
FIG. 5 shows an example of grid indexing transform, where data point (4.9, 7.1) is represented by index vector (2,3) to uniquely identify its cell.

From the perspective of identifying an arbitrary data point and the cell to which it belongs, an index can be used. For effective representation of the cells, a vector index is used instead of a scalar index. This vector index has the same dimensionality as the dimensionality of the predictor set. To achieve this, for each discretized feature, the bins are annotated with numerals ensuring ordinality, starting from number 1. Thus, for the feature variable $x_1$, the bins $x_{11}$, $x_{12}$, ... $x_{1m1}$ are annotated with indices 1, 2, .... $m_1$ respectively. Similar annotation is done for all the features. Each data point is represented by a vector of discrete numeric values representing the indices. Note that these indices retain ordinal property. For example, the value range for bin annotated "1" is lower than the value range for the bin annotated "2". This transformation is called "grid indexing". Data points which transform to same index vector reside in the same cell. This representation is useful for finding other data points in the same cell within the model development dataset as well as finding surrogates in the model surrogate dataset. FIG. 5 illustrates a grid indexing process in accordance with some implementations.

Figure 6:
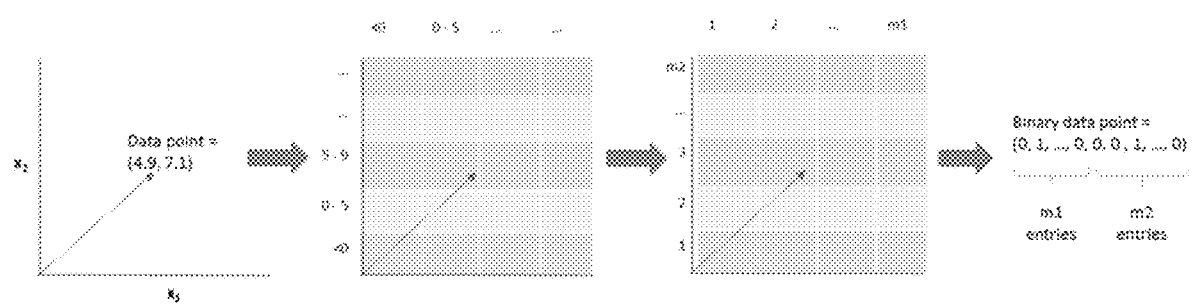
FIG. 6 shows an example of a binarization transform, where data point (4.9, 7.1) is represented as a binary vector.
Figure 7:
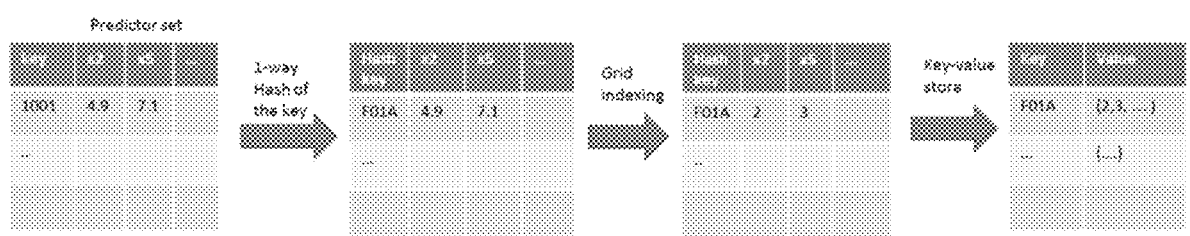
FIG. 7 is a schematic of a process for storing data in the key-value database.

From the perspective of model development, a binarization process has been described in a previous section. Each discretized bin is represented as a binary indicator variable, or could be used to approximate a continuous variable in a set of discrete values. Thus data points within the same cell will have the same binary feature vectors. This representation is useful for model development and scoring but is expensive for finding cell membership and finding the surrogates. FIG. 6 illustrates a binarization transformation for a 2 features predictor set.

To deal with withdrawal of customer data points, it is critical that each data point available is stored in a data store and tracked carefully. Therefore, all the data points that can be used for model development are stored. Two data stores are maintained, one for the model development dataset and another for the model surrogate dataset. A customer may have only one data point, for example in the case of application data, or the customer may have multiple data points, for instance in the case of transactional snapshot data.

A key-value storage database can be used, like an open-source in-memory database for key-value storage such as Redis, for easy storage, retrieval and deletion of the data points. Each data point is tracked through a primary key, which uniquely identifies the customer. To store data when only one data point per customer is provided, only this primary key is needed. With multiple data points pertaining to a single customer, secondary key(s) are needed to uniquely distinguish each instance of the data point corresponding to the customer. For example, while dealing with transactional snapshot data, a timestamp or a transaction number may be used as a secondary key.

The primary key enables quick identification of the data-points corresponding to the customers. For the purpose of privacy and identity protection, a one-way hash function is applied on the primary key, which is subsequently discarded before storing the data point in the data store. This hashed value becomes the key of the data store and is used for identifying the customer at a later stage. In the case of multiple data points for a customer, the secondary key is discarded while storing. In such a case, though, some of the points may be present in the model development dataset, and some in the model surrogate dataset. It is also worth noting that points may belong to different cells and grid indexing would yield different vector indices due to different values of the features.

Figure 8:
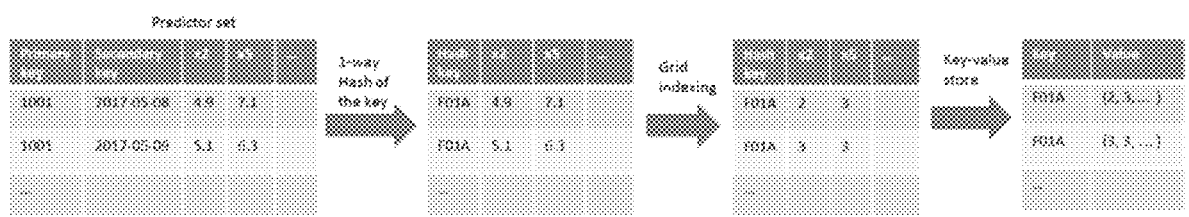
FIG. 8 is a schematic of a process for storing data when customers have multiple data points.

While storing the information pertaining to the customers, in one implementation, only the predictor set is stored. This is the reduced set of features after variable selection discussed above, and allows for compressed representation of the data from an efficiency perspective. In an alternative implementation, all the features are retained irrespective of whether or not they are part of the model. Grid indexing transformation is applied on each data point to get the vector index of the cell to which they belong. The output is the "value" part of the data store. FIG. 8 illustrates grid indexing transformation. It is worth noting that the process is the same for storing the model development dataset as well as the model surrogate dataset in their respective data stores.

A process of looking up the surrogates for a given data point is now described. Recall that the surrogates are stored in the model surrogate dataset, and the data points used in the model are stored in the model development dataset. Further, recall that the cell that a data point belongs to is represented using a vector index by applying grid indexing transformation. Furthermore, a surrogate of a data point has the same cell membership, which means that it also has the same vector index, as also described further herein.

To look up a surrogate of a data point, a grid indexing transform is first applied on the given data point. The surrogates in the model surrogate dataset need to be searched, accordingly the model surrogate data store is searched by value. Recall that the value part of the data store is the vector index of the data point, representing the cell in which the data point resides. Most key-value data stores, including Redis, allow search by value. The output of the search is a set of all the primary keys for which the values match with the value being searched. The primary keys represent the customers.

If customers can have more than one data point, for example in the case of transaction data, this search may yield duplicate primary keys. These are all the surrogates available for the data point being searched. Note that while surrogates can be searched for any data point, the only true use case for the search is when trying to identify a surrogate for a data point to be erased from the model development dataset. Hence, this process is useful when erasing a customer's data, which is described in more detail in the following paragraphs.

There may be instances where a customer's data point(s) may need to be removed from the model data set and erased from the data stores. As explained above, presence of a data point in the model development data store is the only record of a data point being present in the model. Furthermore, presence of a customer's data point(s) in the model surrogate data store indicates that the data points(s) can be used for development but those data point(s) were not used in the model. Hence, deletion of the corresponding record(s) from the two data stores is sufficient to not only ensure data erasure, but also remove the data point(s) from the model. To ensure that the model remains valid (in the sense of having say customer consent) after the erasure, the same number of surrogates from the model surrogate data store as the number of data points being erased from the model development data store need to be identified, and those surrogates moved to the model development data store.

To identify a customer's data points, the customer's primary key is hashed, and searched by key in the data stores. All key-value data stores allow search by key. There are at least four scenarios to consider.

Figure 9:
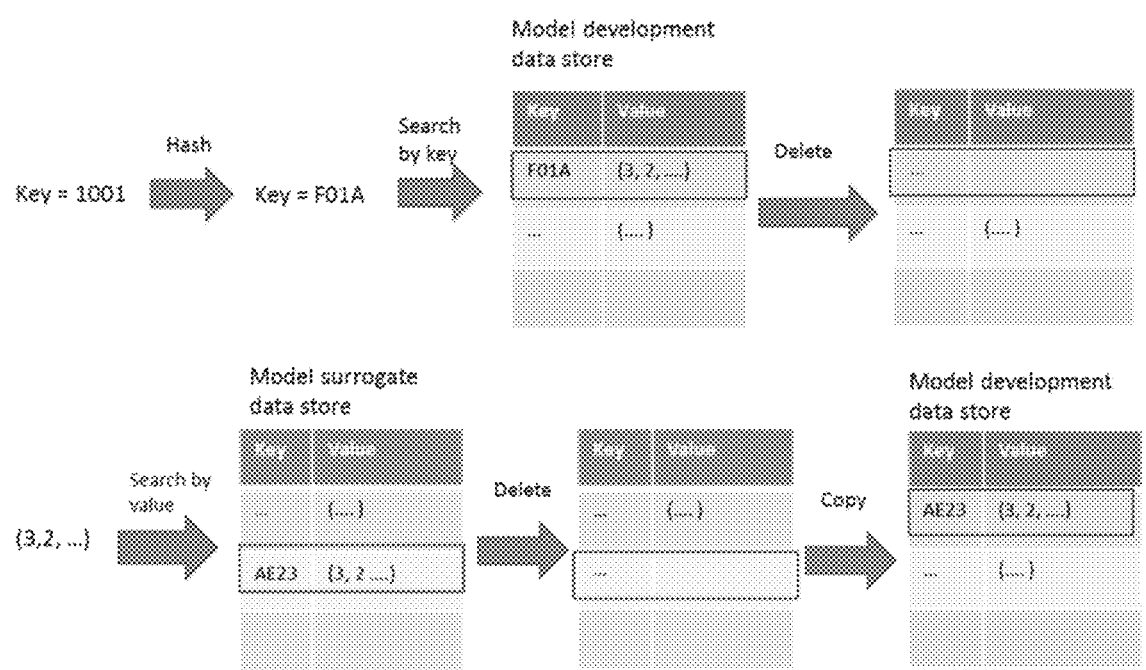
FIG. 9 is a schematic of a process for erasing a data point and replacing it in a model with a surrogate if the data point was part of the model.

Scenario 1: If a single instance of the hashed primary key is found in the model development data store, the value part of the record is extracted and then the entry is eliminated from the data store. A surrogate is then looked up in the model surrogate data store as described above. The first returned instance is marked as the surrogate, and this record is copied to the model development data store and erased from the model surrogate data store. This process is shown in FIG. 9.

Scenario 2: While searching the customer's hashed primary key in the model development data store for deletion, if multiple entries are retrieved, it means that more than one data sample belonging to the customer have been used in the model. This can arise, for example, in the case when a customer has been sampled on two different dates, or there are multiple events, as described earlier. In such cases, the process followed in scenario 1 is repeated, for each value that has been retrieved from the model development data store, thus erasing each such instance from the model and replacing them by their surrogates.

Figure 10:
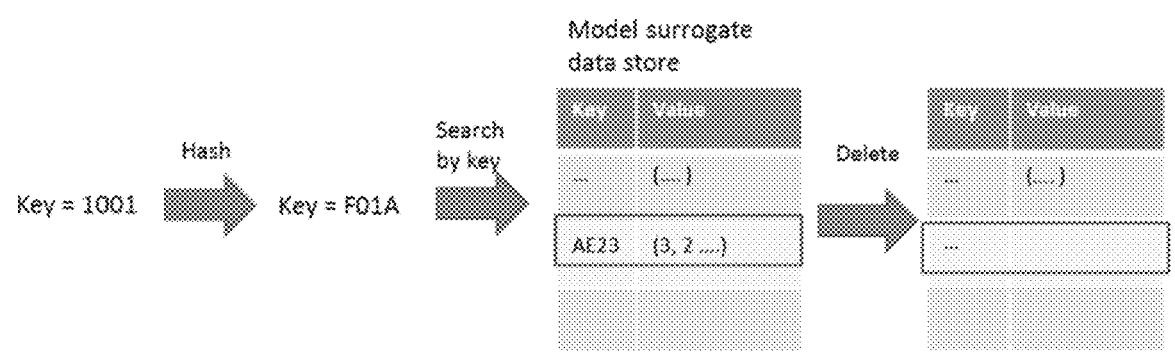
FIG. 10 is a schematic of the process for erasing a data point from model surrogate data store.

Scenario 3: The customer's data point may be stored in the model surrogate data store. This can be the case whether the customer's data point(s) have been used in the model or not. For removing the data point of the customer, from the model surrogate data store, the process is similar to the process described earlier except that only erasure is required and no surrogate discovery is needed, as illustrated in FIG. 10, which is a schematic of the process for erasing a data point from the model surrogate data store.

Scenario 4: While searching the customer's hashed primary key in the model surrogate data store for deletion, if multiple entries are retrieved, it means that more than one data sample belonging to the customer are available in the surrogate store. In such cases, the process followed in scenario 3 is repeated for each instance, thus erasing each such instance from the surrogate store.

Figure 11:
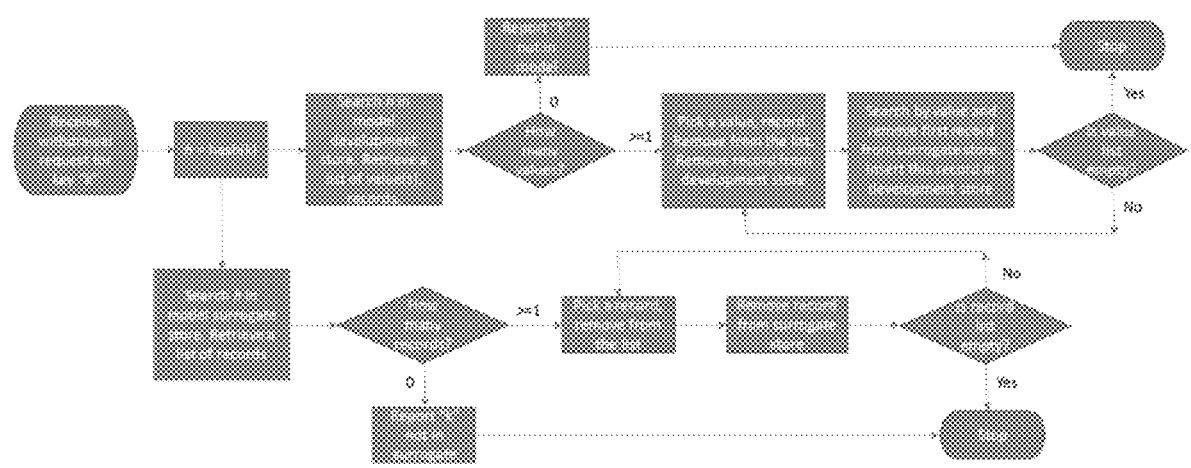
FIG. 11 is a process diagram for erasing a data point for which a customer record is withdrawn and replacing with surrogate.

FIG. 11 shows all four scenarios, and is a process diagram for erasing a data point for which a customer record is withdrawn, and replacing it with surrogate.

The model development data store persists the data points used in the model for only those customers whose data may be used for development. Similarly, the model surrogate data store persists the data points not used in the model for only those customers whose data may also be used for development. Scenarios may arise though where a customer's data may only be able to be used for a limited period. In another scenario, there might be two customers associated, say a husband and a wife, with an account and only one of their data points may be used for development. These opt-ins are called partial opt-ins. There are many more scenarios which can be legitimately called partial opt-in. The information associated with partial opt-ins are the meta-data that describe the opt-in and would necessitate updating the data store based on the meta-data. For instance, if the data points may only be used until a particular date, then the customer's data must be erased on that date and removed from the modeling data set if used there, and replaced by a valid surrogate.

Figure 12:
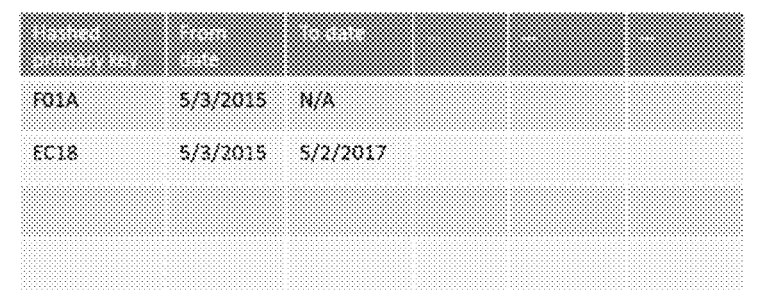

In such scenarios the meta-data needs to be tracked, which can be done so in a separate table in our database. This table contains all the pertinent information required to track data usage and update the data store. The primary key is hashed just as in the case of the data usage data store. FIG. 12 represents an example of a data usage meta-data store, where one customer data record may be used without reserve whereas the second customer data record may be used for a limited time only:

The number and type of data elements that can be stored in this meta-data store are not restricted. This allows for customization and accommodation of situations not previously encountered with other business scenarios. But for a given model instance, once the schema of this meta-data store is set up, it rarely changes.

Data Points Monitor

A process controller, called a data points monitor, is responsible for keeping the data store that tracks the data points that may be used in model development up to date. There are two scenarios which trigger the updating of this data store. In the first scenario, there is a trigger-based process to keep the data store up to date. When a data point may no longer be used for model development, the data points monitor triggers a process for erasing a customer's data, as described herein.

In the second scenario, there is an automated process to keep the data store up to date using meta-data. A sweep of the meta-data store is performed in batch mode at fixed intervals. The frequency, f could be daily, weekly or any other convenient frequency. In each sweep, all primary keys that are associated with data points that may no longer be used for model development on or before the next sweep are identified. For all the identified primary keys, the data points are automatically erased from the modeling data store and the surrogate data store. For instance, if sweep is done every 3 days, and a sweep is performed on May 1, then the next sweep will be on May 4. Thus, all primary keys whose data usage rights expire between May 1 and May 4 are identified, and then the data erasure process is performed on May 1. In the example shown in FIG. 12, the data usage right for EC18 is set to expire after May 2. Thus on May 1, while updating the data point data store, the data point(s) corresponding to EC18 are erased.

Figure 13:
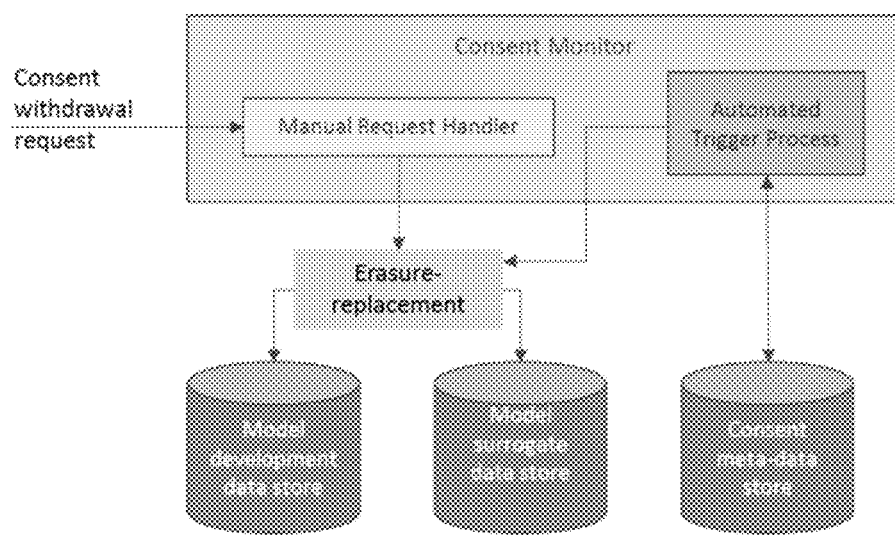
FIG. 13 is a schematic view of the relationship between data points monitor and various components.

FIG. 13 shows a schematic view of the relationship between the data points monitor and various data stores.

Two ways in which data points are eliminated from the model development data store and model surrogate data store include: a) when an external request to eliminate the data point from the model development dataset is received, and b) when a data point is erased based on the meta-data information. This continuous erasure of the data points from the model development data store and movement of data points from the model surrogate data store to the model development data store leads to a reduction in coverage ratio which is called coverage depletion. If the data point being erased was in the model data store then moving another data point, not previously in the model, into the model data store, depletes the coverage of the remaining points in the surrogate data store. Thus the future state depends on a) rate at which data usage withdrawals arrive and b) known data points to be erased in the future based on the meta-data information.

As described above, the system is initiated with a coverage ratio, N, where N is significantly larger than 1, as described in earlier section. More significantly, as long as the coverage ratio remains above 1, for each data point in the model, there is another data point that is available as a surrogate. This is the pragmatic case and once this ratio falls below 1, the model stands the risk of becoming invalid where it was developed on data points on which data consent is expired. In such condition, the coverage buffer is kept higher than 1 for all cells used in the model. If the coverage-buffer of any cell reaches 0, the model needs to be retrained, as the data points in that cell do not have any coverage left. This means that no surrogate is available for replacing this data point in the model, and is called coverage failure. After this point if a data usage withdrawal request arrives, the model would fail.

Figure 14:
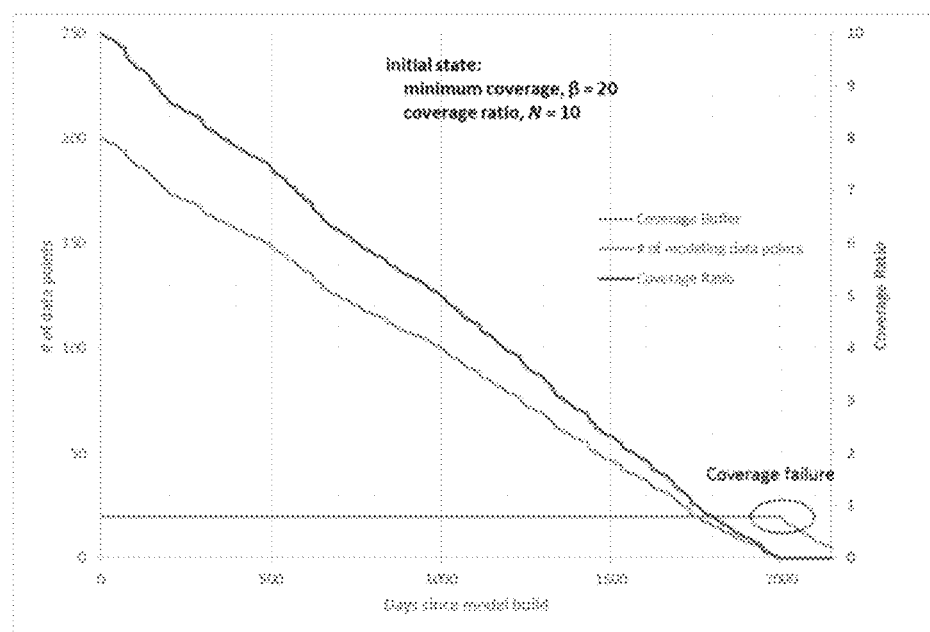
FIG. 14 illustrates time evolution of coverage buffer and ratio for a cell with initial minimum coverage, $\beta=20$ and initial coverage ratio, N=10.

FIG. 14 shows the coverage buffer, coverage ratio and number of data points available as data usage rights are withdrawn over a period of time. It also shows the point of time when coverage failure occurs. As long as coverage failure is predicted to occur after the planned model lifetime, there is no risk of ending up with an invalid model. For example, in FIG. 14, the coverage failure occurs about 2000 days or more than 5 years since the model development. If the planned redevelopment is less than this duration, then the model would not run the risk of becoming invalid. Below, a mean time to coverage failure is described, to help with model governance in the context of data usage rights withdrawal and data erasure from the model.

It is worth noting that a model is valid as long as none of the sample points used in the model data store reaches coverage failure. Thus, it is critical to track the impending coverage failure of each data point, which essentially means that each cell needs to be tracked. This enables when the coverage failure would occur, which in turn leads to a risk of losing validity of the model based on loss of data usage rights, to be estimated or forecast. To enable tracking of model validity, a few key measurements that are discussed below are tracked. The computation of the statistics discussed in these sub-sections is triggered by the data point monitor at the pre-determined frequency, as discussed herein.

For each cell i, whose number of data points in the model development dataset $n_i > \beta$, and number of data points in the model surrogate dataset $n_i' > \beta N$, the following is computed and reported:

Cell coverage, C(model development, i): the number of data points in the model, $n_i$ Coverage buffer, C(model surrogate, i): the number of data points in the surrogate, $n'_i$ Coverage ratio, $n_i'/n_i$ which should be close to N when the system is initiated but may reduce over time.

Figure 15:
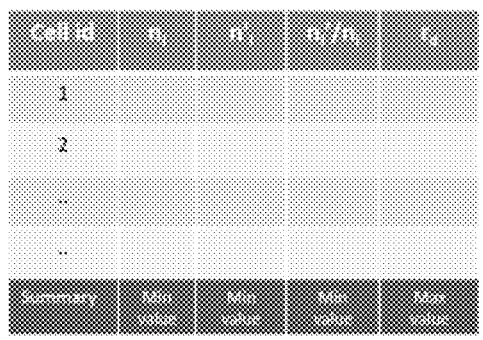
FIG. 15 is an outline of coverage statistics and rate of coverage depletion.

The minimum of all the coverage buffers is also reported. These statistics are shown in FIG. 15. A graphical representation of these metrics is also shown in FIG. 14.

For each of the cells, based on the historic record of when and which cells have seen data points being erased or moved, the rate of coverage depletion is computed and reported. A historic record of computed coverage buffer, $b = n_i'$ is maintained. Thus, at time $t_k$, a time series of $b_0, b_1, \ldots, b_k$ for time period $t_0, t_1, \ldots, t_k$ is provided.

Then, a current rate of coverage depletion at time $t_k$, $r_d(t_k)$, is given by the following equation:

$$r_d(t_k) = \frac{b_k - b_{k-1}}{t_k - t_{k-1}}$$

where, $b_k$ and $b_{k-1}$ are coverage buffer at time $t_k$ and $t_{k-1}$.

The approximate value of $r_d(t_k)$ based on $r_d(t_{k-1})$, $b_k$ and $(t_k - t_{k-1})$ can be estimated as:

$$r_d(t_k)_{est} = f(r_d(t_{k-1}), b_k, (t_k - t_{k-1}))$$

Another estimation of this statistics is the overall rate of coverage depletion, $\hat{r}_d$. This only considers $b_{t0}$ at time $t_0$ and $b_{tk}$ at time $t_k$.

$$\hat{r}_d(t_k) = \frac{b_k - b_0}{t_k - t_0}$$

The resultant report can be generated as shown in FIG. 15.

Figure 16:
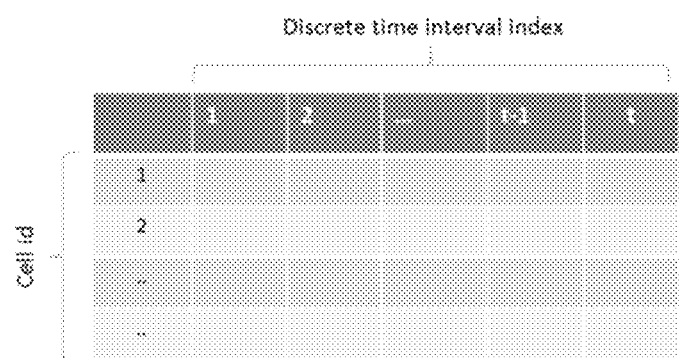
FIG. 16 illustrates a coverage buffer as a function of discrete time interval index.

While knowing current coverage, coverage buffer and depletion rates are useful and informative statistics to have, they are truly useful only if they can be translated into an actionable metric. In the context of the problem, when the model would cease to be valid needs to be determined. As such, a time series of coverage buffer values collected in a series of discrete time intervals is provided. The values are computed and stored every time the data points monitor triggers the computation of the statistics. The resultant discrete time series data, representing coverage buffer as a function of discrete time interval index for each cell, can be generated as shown in FIG. 16.

Using this time series data, for each cell we forecast the time interval index when the coverage buffer would be 0. A schematic of this result can be generated as shown in FIG. 17.

This future time interval index can be converted into number of days since the current day. The earliest time for any cell, when the coverage buffer goes to 0, is the mean time to coverage failure as of the day of reporting. This is the time from a present time, when the model would cease to be valid as there would not be any surrogate left for a data point being removed from the model.

Figure 17:
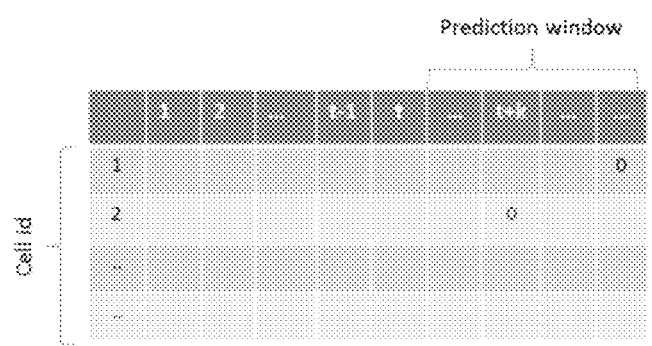
FIG. 17 illustrates a predicted coverage buffer as a function of future discrete time interval index, with coverage buffer of a few cells going to 0 at different discrete time interval index in the prediction window.
Figure 18:
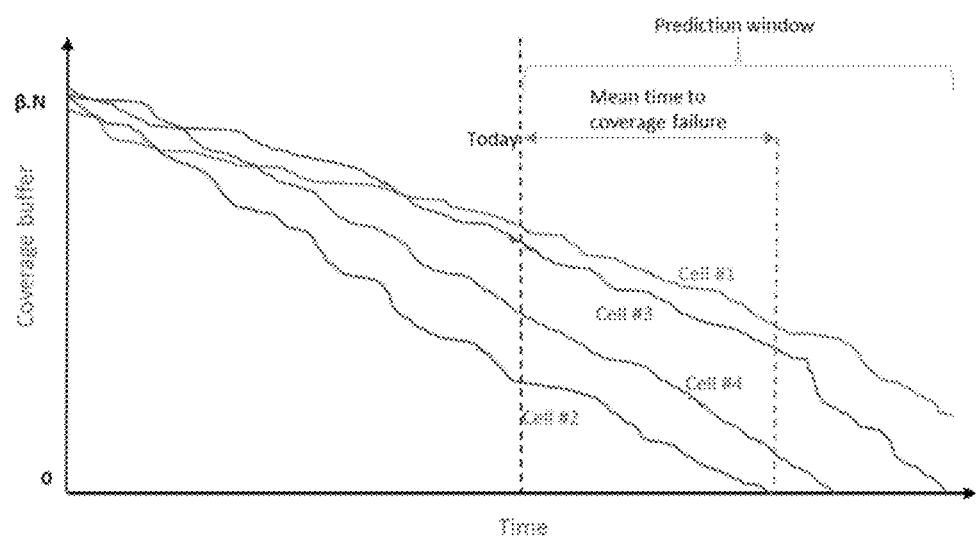
FIG. 18 shows a predicted mean time to coverage failure.
Figure 20:
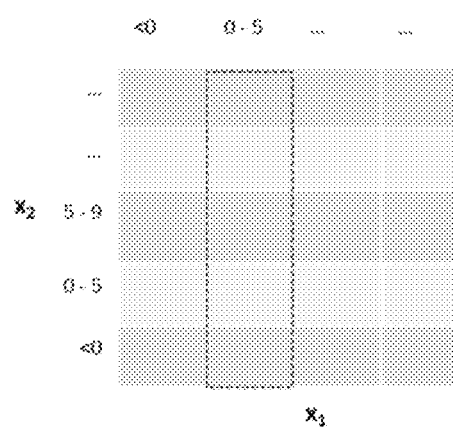
FIG. 20 shows a scorecard bin count as a derivative of cell coverage.

For example, in FIG. 17, the coverage buffer of cell 2 is the predicted to be the earliest to go to 0 at discrete time interval t+k. Thus the mean time to failure is t*f, where f is the frequency at which consent monitor triggers automated erasure. When plotted on an actual time line, this is even more illustrative, as shown in FIG. 18.

In fact, estimated mean time to coverage failure is a function of the coverage needed in each cell in the modeling data store, define by $\beta$, amount of coverage for the same cell in surrogate data set, N, and the rate at which requests for removal arrive for that cell. In the absence of the later information, a current rate of coverage depletion at time $t_k$, $r_d(t_k)$ can be used to estimate mean time to coverage failure. Recall that $r_d(t_k)$ is a negative value, given by following equation:

$$r_d(t_k) = \frac{b_k - b_{k-1}}{t_k - t_{k-1}}$$

Thus, in one such implementation, the estimated mean time to coverage failure, $\Delta t$, can be computed using a linear extrapolation as follows:

$$\Delta t = -\frac{b_k}{r_d(t_k)}$$

While this is the time the model is projected to become invalid, the coverage ratio is tracked, and when the min value of coverage ratio falls below 1, it can act as an early warning system. In many cases, it is likely that the rate of coverage depletion is such that the estimated mean time to coverage failure is post the planned life cycle of the model. Further, in some rare situations, a sudden external event, such as a data breach, may trigger sudden withdrawal of data usage rights at a large scale. In such situations, the monitoring reports described herein still provide a useful tool for knowing the current and projected future states.

If a data point does not have coverage, it can still be scored by an NNET or a Random Forest model, due to their ability to effectively interpolate the data. This is important because the model score is an effective score for all the data points and not only those data points that were used for model building. More importantly, this approach of discretization is a technique in scorecard models. Recall that a scorecard model has multiple predictor features, each of them are discretized and then assigned a score. This is shown in FIG. 19.

Usually, coverage would be added up across all the cells for a fixed bin of a particular feature, to arrive at the number of data points in that bin for the particular feature in the model development dataset. This process of aggregation is shown below, where to get the number of data points in the bin (0-5) for feature x1, the coverage of all the cells where x1 bin is (0-5) is added up.

Scorecard development is predicated on minimum number of data points for each of the bin of each feature. A cell based approach ensures meeting this minimum count criterion for most scenarios, due to the aggregation process described above. Further, where direct aggregation does not yield meeting the criterion, the scorecard approach allows for coarse binning, where adjacent bins of a feature are combined together. Thus, for model scoring, any data point can be scored, using a scorecard, even if that data point did not have coverage in the model development dataset.

There are many situations in which the right to use customer data may be lost or interrupted. This has a potential to derail the use of predictive and decision models in production since the composition of model development datasets may change. A technique that allows for extending the validity of such models for significant duration, and minimizing the need for frequent model rebuilds, has been described herein. More specifically, each instance of data right usage withdrawal is ensured to not trigger a model rebuild. Furthermore, the approach described herein provides the means and processes for complying with data right usage withdrawal, either full or partial withdrawal, in an automated manner, alleviating the need for the model owner to do this manually. A model governance capability is also provided that allows for keeping track of the current state of the model, by periodically computing and reporting the coverage statistics and rate of coverage depletion. To allow for proactively determining when to rebuild the model, the estimated mean time to coverage failure is computed, and reported along with the other model governance statistics. This provides the model owner with an estimate of when the model must be rebuilt based on coverage issues by measuring mean and expected model validity failure times based on the depletion of surrogate data. Thus, it is possible to deal with data right usage withdrawal while keeping the underlying predictive and decision models valid.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for constructing an improved computing model that preserves use rights for data utilized by the model, the method comprising:
   accessing a first dataset to build a computing model, the first data set being subject to terminable usage rights provisions;
   sampling the first dataset to generate a second dataset, the first dataset comprising a first set of data points the second dataset comprising a second set of data points, wherein each data point in the first dataset and the second dataset is represented by a plurality of features having real values, wherein the real values of the features in each data point are expressed as a feature vector;
   discretizing the feature vectors of the first dataset and the second dataset into a finite set of discrete bins each range of the real values possible for each feature of the plurality of features;
   upon determining that the usage rights associated with a data point in the first dataset have been terminated, computing a coverage depletion for the second dataset based on the terminated usage rights associated with the first dataset, wherein the computing comprises quantifying a number of data points remaining in the second data set that are binned into a bin of the finite set of bins;

determining an estimated mean time to coverage failure for the first dataset based on the depletion coverage computed for the second dataset;

eliminating one or more data points from the second dataset due to the terminated usage rights associated with a first data record in the first dataset; and replacing the one or more eliminated data point with a surrogate data point associated with a second data record in the first dataset, the first dataset stored as a set of key values in a database.

2. The method in accordance with claim 1, wherein determining the estimated mean time to coverage failure comprises measuring a mean and an expected model validity failure time based on the depletion of the second dataset.

3. The method in accordance with claim 1, wherein, at least a first key value comprises a primary key to uniquely identify a first entity associated with first data included in the first dataset.

4. The method in accordance with claim 3, wherein the first entity has the right to terminate usage rights associated with the first data included in the first dataset, and a secondary key is associated with the primary key, the secondary key corresponding to a transaction data point for the first entity.

5. The method in accordance with claim 4, wherein a one-way hash function is applied on the primary key to generate a hashed value to identify the first entity.

6. The method in accordance with claim 5, wherein a consent validity of the first entity is tracked to determine the first entity's continued consent for use of data associated with the first entity in the first model.

7. The method in accordance with claim 1, wherein the second data record has an identical distribution of values as the first data record.

8. A system for preserving use rights for data utilized by a computing model, the system comprising one or more processors configured to perform operations comprising:

accessing a first dataset to build a computing model, the first data set being subject to terminable usage rights provisions;

sampling the first dataset to generate a second dataset, the first dataset comprising a first set of data points the second dataset comprising a second set of data points, wherein each data point in the first dataset and the second dataset is represented by a plurality of features having real values, wherein the real values of the features in each data point are expressed as a feature vector;

discretizing the feature vectors of the first dataset and the second dataset into a finite set of discrete bins each range of the real values possible for each feature of the plurality of features;

upon determining that the usage rights associated with a data point in the first dataset have been terminated, computing a coverage depletion for the second dataset based on the terminated usage rights associated with the first dataset, wherein the computing comprises quantifying a number of data points remaining in the second data set that are binned into a bin of the finite set of bins;

determining an estimated mean time to coverage failure for the first dataset based on the depletion coverage computed for the second dataset;

eliminating one or more data points from the second dataset due to the terminated usage rights associated with a first data record in the first dataset; and replacing the one or more eliminated data point with a surrogate data point associated with a second data record in the first dataset, the first dataset stored as a set of key values in a database.

9. The system in accordance with claim 8, wherein determining the estimated mean time to coverage failure comprises measuring a mean and an expected model validity failure time based on the depletion of the second dataset.

10. The system in accordance with claim 8, wherein, at least a first key value having a primary key to uniquely identify a first entity associated with first data included in the first dataset.

11. The system in accordance with claim 10, wherein the first entity has the right to terminate usage rights associated with the first data included in the first dataset, and a secondary key is associated with the primary key, the secondary key corresponding to a transaction data point for the first entity.

12. The system in accordance with claim 11, wherein a one-way hash function is applied on the primary key to generate a hashed value to identify the first entity.

13. The system in accordance with claim 12, wherein a consent validity of the first entity is tracked to determine the first entity's continued consent for use of data associated with the first entity in the first model.

14. The system in accordance with claim 8, wherein the second data record that has an identical distribution of values as the first data record.

15. A non-transitory machine-readable medium storing instructions that, when executed by the processor, cause the at least one programmable processor to perform operations to:

extract, using data sampling, a portion of a first dataset to generate a second dataset, the first dataset comprising a first set of data points and the second dataset comprising a second set of data points, wherein each data point in the first dataset and the second dataset is represented by a plurality of features having real values, wherein the real values of the features in each data point are expressed as a feature vector;

discretize the feature vectors of the first dataset and the second dataset into a finite set of discrete bins each range of the real values possible for each feature of the plurality of features;

receive data representing the data right usage withdrawal from the first dataset;

determine a depletion of the second dataset according to the data right usage withdrawal;

compute an estimated mean time to coverage failure of a computing model based on the depletion of the second dataset according to the data right usage withdrawal, the computing comprising quantifying a number of data points remaining in the second data set that are binned into a bin of the finite set of bins;

eliminate at least one data points from the second dataset due to the termination of usage rights associated with a first data record in the first dataset;

replacing the at least one eliminated data point with a surrogate data point associated with a second data record in the first dataset, the first dataset stored as a set of key values in a database, the first data record having a first distribution of values and the second data record having a second distribution of values.

16. The system in accordance with claim 15, wherein the computing the estimated mean time to coverage failure comprises measuring a mean and an expected model validity failure time based on the depletion of the second dataset according to the data right usage withdrawal.

17. The system in accordance with claim 15, wherein at least one key value comprises a primary key to uniquely identify a customer in the first dataset.

18. The system in accordance with claim 17, wherein the operations further comprise generating a secondary key associated with the primary key, the secondary key corresponding to a transaction data point for the customer.

19. The system in accordance with claim 17, further comprising applying a one-way hash function on the primary key to generate a hashed value to identify the customer.

20. The system in accordance with claim 19, wherein the operations further comprise tracking a consent validity of the customer representing the customer's continued consent validity for use in the original model.

* * * * *